(12) United States Patent
Camara et al.

(10) Patent No.: US 7,039,727 B2
(45) Date of Patent: May 2, 2006

(54) SYSTEM AND METHOD FOR CONTROLLING MASS STORAGE CLASS DIGITAL IMAGING DEVICES

(75) Inventors: Franc J. Camara, Redmond, WA (US); Po Yuan, Renton, WA (US); Vladimir Sadovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 09/949,166

(22) Filed: Sep. 7, 2001

(65) Prior Publication Data
US 2002/0178304 A1 Nov. 28, 2002

Related U.S. Application Data

(60) Provisional application No. 60/240,772, filed on Oct. 17, 2000.

(51) Int. Cl.
*G06F 3/00* (2006.01)
(52) U.S. Cl. .................. 710/5; 710/2; 710/30; 710/33; 710/62; 710/72; 710/73; 710/74
(58) Field of Classification Search .................... 710/5, 710/6, 11, 8, 62, 72, 74, 2; 345/771, 810; 714/41
See application file for complete search history.

(56) References Cited

U.S. PATENT DOCUMENTS

| | | | |
|---|---|---|---|
| 5,459,867 A | 10/1995 | Adams et al. | |
| 5,548,783 A | 8/1996 | Jones et al. | |
| 5,845,147 A | 12/1998 | Vishlitzky et al. | |
| 6,115,771 A | 9/2000 | Born | |
| 6,357,021 B1 * | 3/2002 | Kitagawa et al. | ............. 714/41 |
| 6,489,973 B1 * | 12/2002 | Heiden | ........................ 345/771 |
| 2002/0122071 A1 * | 9/2002 | Camara et al. | ............. 345/810 |

FOREIGN PATENT DOCUMENTS

| | | |
|---|---|---|
| EP | 0 330 044 | 8/1989 |
| EP | 0 859 326 A2 | 8/1998 |
| WO | WO 95/29465 | 11/1995 |
| WO | 99/60786 | 11/1999 |

OTHER PUBLICATIONS

Andrew S. Tanenbaum, Structured Computer Organization, 1984, Prentice-Hall, Second Edition, pp. 10-12.*
EP Search report dated Oct. 15, 2004 in application No. EP 01124147.
EP Search report dated Jan. 28, 2005 in application No. EP 01124147.

* cited by examiner

*Primary Examiner*—Kim Huynh
*Assistant Examiner*—Joshua D. Schneider
(74) *Attorney, Agent, or Firm*—Shook, Hardy & Bacon, L.L.P.

(57) ABSTRACT

A method is provided for controlling a Mass Storage Class Digital Imaging Device using a SCSI pass through protocol. The protocol is based on industry standard SCSI protocol with modifications and extensions to allow transparent communication over a medium and is referred to as SCSI Pass Through (SPT). This protocol defines a set of commands that are initiated in a computer. The commands also include and extend industry standard Picture Transfer Protocol and are targeted for application and execution in a Mass Storage Class Digital Imaging Device. The invention includes the definition of data buffers in the form of data structures that can be used for passing and receiving information related to the digital imaging device. The protocol is applicable to communication mediums that can be utilized in connecting any digital storage device to a computing device.

17 Claims, 3 Drawing Sheets

SYSTEM AND METHOD FOR CONTROLLING MASS STORAGE CLASS DIGITAL IMAGING DEVICES

CROSS REFERENCE TO RELATED APPLICATIONS

This application claims the benefit of U.S. provisional application Ser. No. 60/240772 filed Oct. 17, 2000.

FIELD OF THE INVENTION

The present invention relates to computer software. More specifically, this invention relates to a system and method for communicating with and controlling mass storage class digital imaging devices.

BACKGROUND OF THE INVENTION

A computer system that can communicate with a mass storage class digital imaging device such as a digital camera is a common arrangement. For example, there are several digital cameras that communicate with personal computers (PCs) however, the methods for accomplishing communication and control are proprietary to each manufacturer. This essentially poses a problem for users because of the multitude of associated interfaces and drivers that are required for the various brands and models of cameras on the market.

One attempt to resolve this problem was the introduction of a standard protocol to be utilized by manufacturers, namely the USB Mass Storage Class Device specification. The implementation of a digital camera in accordance with the afore mentioned specification provides the benefit of allowing an operating system with native driver support to provide 'Plug and Play' experience for the user. The implementation also allows such a conforming device to appear on the PC as a storage device and allows the user to copy files to or from the device. However, a digital camera potentially has several files which are not related to stored images and as such, the user will be presented with a multitude of files through which they must navigate in order to obtain the image file of interest. A further drawback of the implementation of the USB Mass Storage Class Device specification is the inability to actually control the device. For example, under existing support for cameras, it is not possible to set the clock on the camera from PC. This and other specific controls that could benefit a user are not available under the presently available implementations for uniform camera support. For example, a user may desire to perform live capture, query the camera or adjust a camera property setting. Presently, none of these functions are possible with the existing USB Mass Storage Class Device specification. Instead, a specific driver or application from the manufacturers is required in order to accomplish these tasks.

Accordingly, there exists a need for a method that allows Mass Storage Class Digital Imaging Devices, particularly cameras to take advantage of interfaces and features that are a part of the user experience. An extensible control protocol is needed for controlling most common tasks in these digital content devices such as a Mass Storage Class Digital Camera, without the need for manufacturers to develop custom control software. In other words, manufacturers that implement the control protocol on their devices will be able to benefit from the ability to have the device controlled by an operating system application such as Windows Image Acquisition wizard (WIA) or by other programs through an application program interface (API) defined within an operating system.

SUMMARY OF THE INVENTION

In one aspect, the present invention is directed to a method of communicating with a Mass Storage Class Digital Imaging Device. The method provides a protocol that allows the control of a digital imaging device that is coupled to a computer. The protocol is based on industry standard SCSI protocol with modifications and extensions to allow transparent communication over a connection medium and is referred to as SCSI Pass Through (SPT).

In another aspect, the present invention is directed to the definition of a set of commands that are initiated in a computer, include and extend industry standard Picture Transfer Protocol and are targeted for application and execution in a Mass Storage Class Digital Camera.

In a further aspect, the present invention is directed to the control of a digital camera using the afore mentioned protocol and commands which together are designated as the SCSI Pass Through Camera Commands Protocol (SPTCCP).

In yet another aspect, the present invention is directed to the definition of data buffers in the form of data structures that can be used for passing and receiving information related to the digital imaging device.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
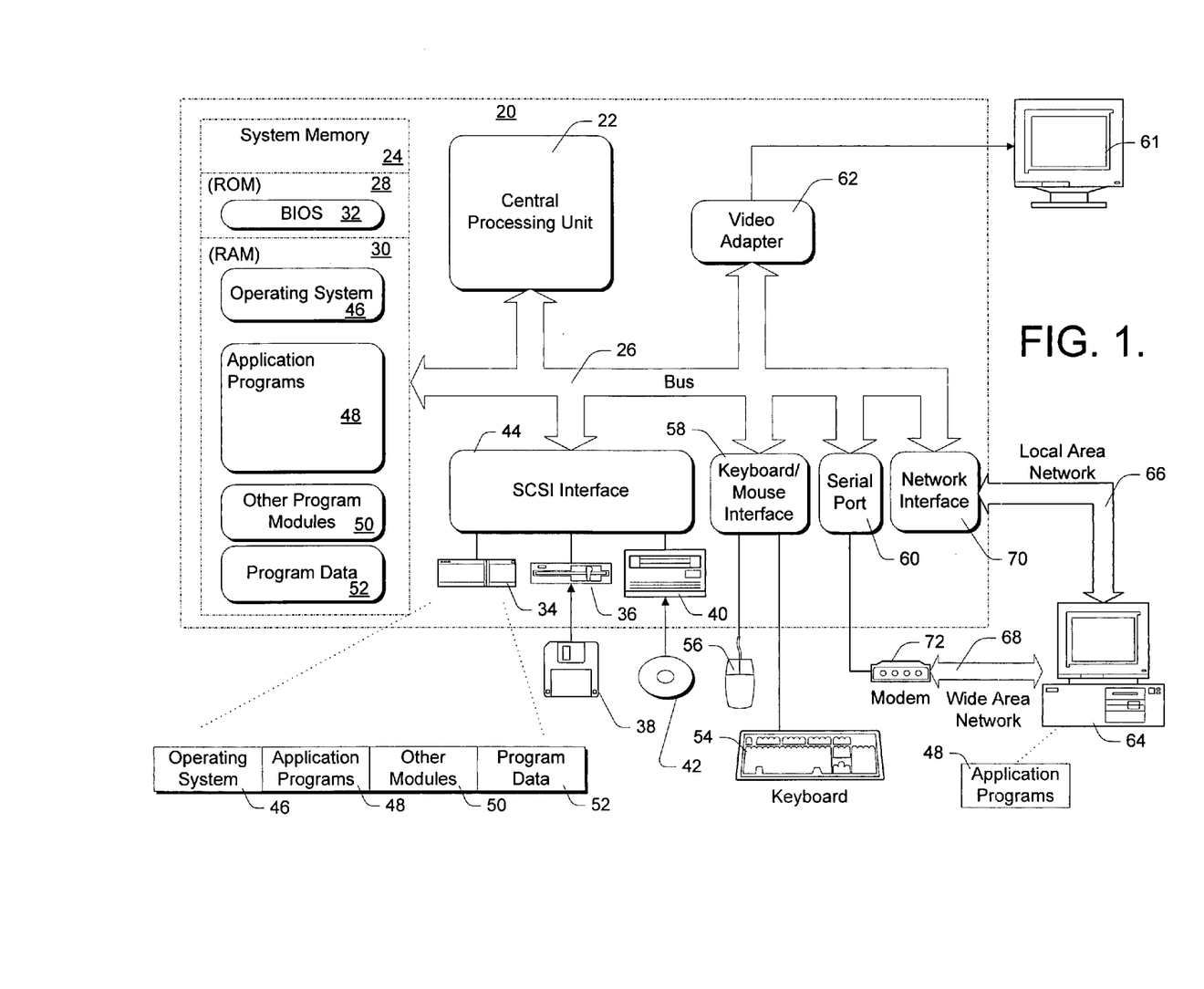
FIG. 1 is a block diagram of a suitable computing system environment for use in implementing the present invention.

The present invention provides a system and method for controlling a Mass Storage Class Digital Imaging Device such as a Mass Storage Class Digital Camera (MSC) or other similar digital content devices that contain a structured file system, such as certain types of hard drives, compact disk devices etc. The particular embodiments described herein are intended in all respects to be illustrative rather than restrictive. Alternate embodiments will become apparent to those skilled in the art to which the present invention pertains without departing from its scope. FIG. 1 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 20. Components of computer 20 include, but are not limited to, a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 20 typically includes a variety of computer readable media. Computer readable media can be any available media that can be accessed by computer 20 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer readable media.

The system memory 24 includes computer storage media in the form of volatile and/or nonvolatile memory such as read only memory (ROM) 28 and random access memory (RAM) 30. A basic input/output system 32 (BIOS), containing the basic routines that help to transfer information between elements within computer 20, such as during start-up, is typically stored in ROM 28. RAM 30 typically contains data and/or program modules that are immediately accessible to and/or presently being operated on by processing unit 22. By way of example, and not limitation, FIG. 1 illustrates operating system 46, application programs 48, other program modules 50, and program data 52.

The computer 20 may also include other removable/non-removable, volatile/nonvolatile computer storage media. By way of example only, FIG. 1 illustrates a hard disk drive 34 that reads from or writes to non-removable, nonvolatile magnetic media, a magnetic disk drive 36 that reads from or writes to removable, nonvolatile magnetic disk 38, and an optical disk drive 40 that reads from or writes to a removable, nonvolatile optical disk 42 such as a CD ROM or other optical media. Other removable/non-removable, volatile/non-volatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 34, magnetic disk drive 36, and optical disk drive 40 are typically connected to the system bus 26 by a Small Computer System Interface (SCSI) 44. Alternatively, the hard disk drive 34, magnetic disk drive 36 and optical disk drive 40 may be connected to the system bus 26 by a hard disk drive interface, a magnetic disk drive interface, and an optical drive interface, respectively.

The drives and their associated computer storage media discussed above and illustrated in FIG. 1, provide storage of computer readable instructions, data structures, program modules and other data for the computer 20. In FIG. 1, for example, hard disk drive 34 is illustrated as storing operating system 46, application programs 48, other program modules 50, and program data 52. Note that these components can either be the same as or different from operating system 46, application programs 48, other program modules 50, and program data 52. A user may enter commands and information into the computer 20 through input devices such as a keyboard 54 and pointing device 56, commonly referred to as a mouse, trackball or touch pad. Other input devices (not shown) may include a microphone, joystick, game pad, satellite dish, scanner, or the like. These and other input devices are often connected to the processing unit 22 through a user input interface 58 or a serial port interface 60 that is coupled to the system bus, but may be connected by other interface and bus structures, such as a parallel port, game port or a universal serial bus (USB). A monitor 61 or other type of display device is also connected to the system bus 26 via an interface, such as a video adapter 62. In addition to the monitor 61, computers may also include other peripheral output devices such as speakers and printers, which may be connected through an output peripheral interface.

The computer 20 may operate in a networked environment using logical connections to one or more remote computers, such as a remote computer 64. The remote computer 64 may be a personal computer, a server, a router, a network PC, a peer device or other common network node, and typically includes many or all of the elements described above relative to the computer 20, although only a memory storage device has been illustrated in FIG. 1. The logical connections depicted in FIG. 1 include a local area network (LAN) 66 and a wide area network (WAN) 68, but may also include other networks. Such networking environments are commonplace in offices, enterprise-wide computer networks, intranets and the Internet.

When used in a LAN networking environment, the computer 20 is connected to the LAN 66 through a network interface or adapter 70. When used in a WAN networking environment, the computer 20 typically includes a modem 72 or other means for establishing communications over the WAN 68, such as the Internet. The modem 72, which may be internal or external, may be connected to the system bus 26 via the serial port interface 60 or other appropriate mechanism. In a networked environment, program modules depicted relative to the computer 20, or portions thereof, may be stored in the remote memory storage device. By way of example, and not limitation, FIG. 1 illustrates remote application programs 48 as residing on memory device 64. It will be appreciated that the network connections shown are exemplary and other means of establishing a communications link between the computers may be used.

Although many other internal components of the computer 20 are not shown, those of ordinary skill in the art will appreciate that such components and the interconnection are well known. Accordingly, additional details concerning the internal construction of the computer 20 need not be disclosed in connection with the present invention.

Those skilled in the art will understand that program modules such as the operating system 46, application programs 48 and data 52 are provided to the computer 20 via one of its memory storage devices, which may include ROM 28, RAM 30, hard disk drive 34, magnetic disk drive 36 or optical disk drive 40. Preferably, the hard disk drive 34 is used to store data 52 and programs, including the operating system 46 and application programs 48.

When the computer 20 is turned on or reset, the BIOS 32, which is stored in the ROM 28 instructs the processing unit 22 to load the operating system from the hard disk drive 34 into the RAM 30. Once the operating system 46 is loaded in RAM 30, the processing unit 22 executes the operating system code and causes the visual elements associated with the user interface of the operating system 46 to be displayed on the monitor 61. When an application program 48 is opened by a user, the program code and relevant data are read from the hard disk drive 34 and stored in RAM 30.

Figure 2:
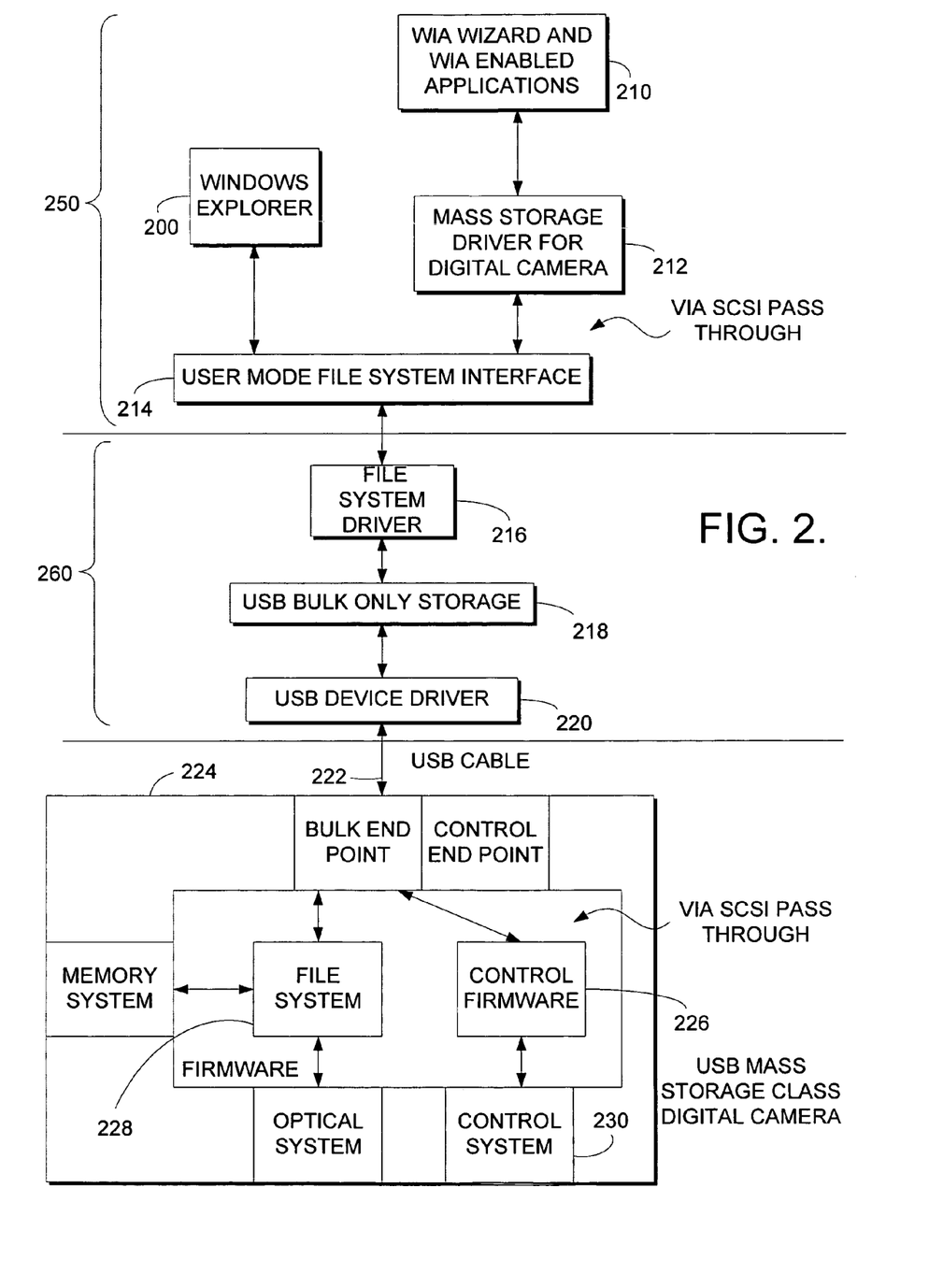
FIG. 2 is a block diagram illustration of the architecture of communication between an application program and a USB Mass Storage Class Digital Camera device (MSC).

In FIG. 2, an exemplary illustration of an architecture for practicing the present invention is shown. There are three components that make up the referenced architecture namely the user component 250, the Kernel component 260 and the external USB Mass Storage Class Digital Camera (MSC) 224. The present invention is implemented in the user component 250 and uses existing architecture and methods within the Kernel 260, to communicate to firmware implementation within MSC 224 via a USB connection 222. It should be noted that the method of the present invention is independent of the physical bus medium by which a device is connected to the PC. The present invention is also applicable to perform other functions such as previously discussed, wherein a PC application such as Windows Explorer 200 can be used via a file system interface 214 to communicate with the kernel and ultimately display a representation of the MSC device 224 and its associated file system 228.

An embodiment of the present invention is directed at controlling the MSC device 224 through commands that are initiated by the Windows Image Acquisition (WIA) Wizard and other WIA enabled applications 210. The initiated commands are packaged as SCSI Pass-through commands by the Mass Storage Driver for Digital Cameras 212 and then transparently passed through the User mode file system interface 214, the kernel components 260, and the USB Cable 222 into the MSC 224. The destination of the discussed commands is the control firmware 226 of the MSC 224. The firmware 226 contains manufacturer provided hardware and software that is aware and able to decipher the SCSI Pass Through Camera Commands Protocol (SPTCCP) to obtain the underlying device control command, such as standard Photo Imaging Marketing Association (PIMA) Picture Transfer Protocol (PTP) commands. The intended command is obtained and then executed by the control system 230 that is located within MSC 224. Any associated responses are delivered back to the initiating application through a reverse of the process described above.

In general, a protocol is defined by how information is exchanged between two or more devices by using various bits and elements of data that are structured and related to each other. Likewise, within SPTCCP protocol there is a defined data structure that is used for the exchange of information. Because SPTCCP has as its underlying basis the SCSI protocol, the elements of the SPTCCP structure are derived from and compatible with those found in SCSI. A typical SCSI Pass Through data structure is defined as follows in C/C++ form:

```
typdef struct SCSI_PASS_THROUGH_DIRECT{
    USHORT    Length;
    UCHAR     ScsiStatus;
    UCHAR     PathId;
    UCHAR     TargetId;
    UCHAR     Lun;
    UCHAR     Cdblength;
    UCHAR     SenseInfoLength;
    UCHAR     DataIn;
    ULONG     DataTransferLength;
    ULONG     TimeoutValue;
    PVOID     DataBuffer;
    ULONG     SenseInfoOffset;
    UCHAR     Cdb[16];
}SCSI_PASS_THROUGH_DIRECT, * PSCSI_PASS_THROUGH_DIRECT
```

The SCSI Pass Through structure including data buffers and other elements are translated into driver space and passed through to the target device. The DataBuffer and the Cdb from the structure shown above, contain the information that define the command protocol for MSC 224. In other words SPTCCP is defined by the specification and arrangement of bits within the Cdb and the DataBuffer. Cdb is the command descriptor block that contains the SCSI commands and parameters. In an embodiment of this invention, the 6-byte long Cdb otherwise known as Group 0 Cdb, is used to define the protocol. Thus with reference to the pass through structure discussed and illustrated above, only the first 6 bytes of the 16 byte Cdb within the pass through structure are utilized. The content of these 6 bytes determine the type and format of commands destined for the MSC 224. A discussion on the specific structure of Cdb is necessary to provide an understanding of the protocol of the present invention.

Figure 3:
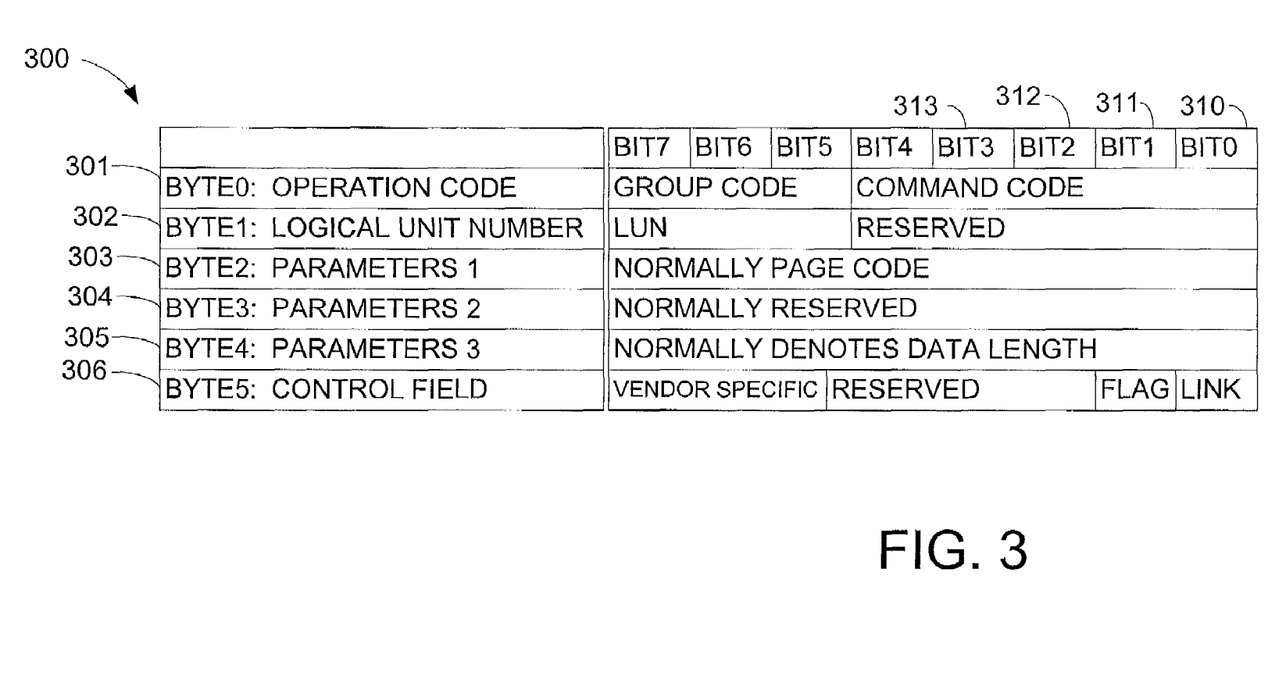
FIG. 3 is an illustration of a data structure utilized in sending commands to MSC.

FIG. 3 is an illustration of the Cdb generally designated as 300, used by SPTCCP for communication with a MSC. As shown, each byte 301–306 is designated to hold a particular type of information. Within each byte, the information may be represented by individual bits or a group of bits. For example, Byte0 301 is designated to hold the Operation Code for a particular command. The Operation Code consists of a Group code and a Command code, thus within Byte0 301, 5 bits (Bit0–Bit4) are used to represent the Command code, and 3 bits (Bit5–Bit7) are used to represent the Group code.

The command codes that are available or used in SPTCCP are dictated by both the SCSI committee and the target device, in this case MSC. In an embodiment of this invention, there are four mandatory command codes associated with MSC. Each of these commands is sent to the device by populating the Cdb structure with appropriate parameters. This means that Byte0 will be populated with the appropriate command for MSC. The following table summarizes commands for camera devices. The camera device category is one of the device types (such as Direct-access Devices, Printer Devices, and Scanner Devices) defined in the SCSI-2 specification. These command and operations may also be extended in the future. The following are operation codes that can be supported by MSC devices:

| Command name | Operation code | Type |
|---|---|---|
| TEST UNIT READY | 00h | M |
| SEND DIAGNOSTIC | 1Dh | M |
| REQUEST SENSE | 03h | M |
| INQUIRY | 12h | M |
| READ INFO | E0h | M |
| WRITE INFO | E1h | O |
| START STOP CAPTURE | E2h | O |
| RESET DEVICE | DFh | O |

Key:
M = command implementation is mandatory for SPTCCP.
O = command implementation is optional, but recommended for SPTCCP.

This list of operation codes can be extended by vendors to define new functions. However, the above codes must behave as defined in order for a device to be considered an SPTCCP device.

Also with reference to FIG. 3, Byte1 (302) is the storage location for the Logical Unit Number (LUN) of the target device. Because this invention uses SCSI type commands, there is a need to conform to SCSI standards. There is a requirement within SCSI protocol that each device must have a unique identification on the network and this address is referred to as the LUN, and typically ranges from 0–15. Byte2 (303) is the storage location for the first of three parameters that can be passed by a Cdb. In one embodiment of this invention, that location is used to store Page Code, a memory address. Byte3 (304) is normally reserved but is sometime used depending on the command to store the lo-byte of a code. Byte4 (305) holds the information on the length of any data that may be associated with the underlying command. A discussion to be found later on in this document about the four commands will better illustrate this concept. Byte5 (306) holds control type of information which consists of a link bit, a flag, a reserved number of bits and information that is specific to the vendor.

As previously discussed, for each of the previously mentioned SCSI command codes used in SPTCCP there are specific entries that are made in the Cdb and in some cases there is also a data buffer structure and a reply structure associated with the command. The format and content of these entries and structures define SPTCCP. As such, to more fully describe the protocol for communicating and controlling MSC devices, it is necessary to discuss some specific commands and responses in terms of how the commands are structured within the Cdb buffer and what parameters are provided by and between the initiating device i.e. the PC, and the target device i.e. MSC. While the general content of the Cdb associated with each command will not be discussed in any great detail, some parameters may be commented on because of a unique feature or importance to the protocol. It is understood by those skilled in the art that variations of these specifications are within the scope of the invention.

The first of such commands for MSC is Test Unit Ready which is designated by a specific hexadecimal code-00H. This command reports whether a target device is ready to execute commands. As discussed earlier, the first 6 bytes of the Cdb are populated and structured with a specific layout. The following layout describes the Cdb associated with the Test Unit Read command.

| | Bit7 | Bit6 | Bit5 | Bit4 | Bit3 | Bit2 | Bit1 | Bit0 |
|---|---|---|---|---|---|---|---|---|
| Byte0: Operation Code | 00H | | | | | | | |
| Byte1: Logical Unit Number | LUN | | | Reserved | | | | |
| Byte2: Parameters 1 | Reserved | | | | | | | |
| Byte3: Parameters 2 | Reserved | | | | | | | |
| Byte4: Parameters 3 | Reserved | | | | | | | |
| Byte5: Control field | Vendor Specific | | | Reserved | | | Flag | Link |

Within SPTCCP this is the simplest command because it has very limited responses and it also has no requirement for a data buffer. The control field Byte5 is set to zero as there is little need for any vendor linked commands. Test Unit Ready returns a status code of 00H (Good) if the device is ready to execute commands or it returns 01H (Check Condition) if the device is not ready.

The second MSC command is Inquiry, which is designated by the hexadecimal code-12H. This command requests that the target device, in this case MSC identify the device manufacturer, model information, serial number, and other such information. In this case, the first 6 bytes of the Cdb are populated and structured with the following layout:

|                          | Bit7   | Bit6     | Bit5 | Bit4 | Bit3 | Bit2 | Bit1 | Bit0 |
|--------------------------|--------|----------|------|------|------|------|------|------|
| Byte0: Operation Code    | 12H    |          |      |      |      |      |      |      |
| Byte1: Logical Unit Number | LUN  |          |      | Reserved |  |      |      | EVPD |
| Byte2: Parameters 1      | Page Code |       |      |      |      |      |      |      |
| Byte3: Parameters 2      | Reserved |        |      |      |      |      |      |      |
| Byte4: Parameters 3      | Allocation length | |    |      |      |      |      |      |
| Byte5: Control field     | Vendor Specific | | Reserved | | |    | Flag | Link |

As previously noted, the protocol and method of this invention are applicable to other devices. As such, the various commands that are being discussed can also be tailored to a specific device. In this instance, for MSC devices, the Inquiry command is recommended to be implemented as two inquiry cases, wherein specific bits in the layout shown above are set to predetermined values. One case is the standard query command, wherein Bit0 of Byte1 the EVPD is set to 0 and Byte2 the Page Code is also set to 0. The other case is the unit serial number command where the EVPD is set to 1 and the Page Code is set to 80H.

Each of these command cases generates a different response from the MSC device. In particular, the standard query command returns a data buffer that has the following data structure:

| Byte # | Bit7 | Bit6 | Bit5 | Bit4 | Bit3 | Bit2 | Bit1 | Bit0 |
|--------|------|------|------|------|------|------|------|------|
| 0 | Peripheral qualifier | | | Device type code | | | | |
| 1 | RMB | Device type modifier | | | | | | |
| 2 | ISO version | | ECMA version | | | ANSI approved version | | |
| 3 | AENC | TrmIOP | Reserved | | Response data format | | | |
| 4 | Additional data length | | | | | | | |
| 5 | Reserved | | | | | | | |
| 6 | Reserved | | | | | | | |
| 7 | RelAdr | Wbus32 | Wbus16 | Sync | Linked | Reserved | CmdQue | SftRe |
| 8–15 | Vendor identification string | | | | | | | |
| 16–31 | Product identification string | | | | | | | |
| 32–35 | Product revision level string | | | | | | | |
| 36–55 | Vendor-specific information string | | | | | | | |
| 56–95 | Reserved | | | | | | | |
| 96–end | Vendor-specific data | | | | | | | |

It should be noted that the definitions and meanings of the indicated fields in the structure above conform to standard SCSI2 specifications. The details of SCSI2 specifications are beyond the scope of this application and as such will not be discussed in any detail.

In the case of the unit serial number command, the returned page also conforms with SCSI2 specifications and has the following data structure:

| Byte # | Bit7 | Bit6 | Bit5 | Bit4 | Bit3 | Bit2 | Bit1 | Bit0 |
|--------|------|------|------|------|------|------|------|------|
| 0 | Peripheral qualifier | | | Device type code | | | | |
| 1 | Page Code (80H) | | | | | | | |
| 2 | Reserved | | | | | | | |
| 3 | Page length (n-3) | | | | | | | |
| 4 | Product serial number | | | | | | | |
| N | | | | | | | | |

Here again, the layout and content of the returned data structure is dictated by a standard that is beyond the scope of this document. The particulars of the information contained in the above illustrations and their usefulness are known to those skilled in the art.

The third MSC command is Request Sense, which is designated by the hexadecimal code 03H. This command allows an initiator such as a PC to report error information. The error could be related to a current operation or the most recent operation. Information is transferred from the target device such as a camera to the initiator.

The content of the various bytes are specific to the target device and determine the interpretation of the received information. The first 6 bytes of the Cdb are populated and structured with the following layout:

|  | Bit7 | Bit6 | Bit5 | Bit4 | Bit3 | Bit2 | Bit1 | Bit0 |
|---|---|---|---|---|---|---|---|---|
| Byte0: Operation Code | 03H | | | | | | | |
| Byte1: Logical Unit Number | LUN | | | Reserved | | | | |
| Byte2: Parameters 1 | Reserved | | | | | | | |
| Byte3: Parameters 2 | Reserved | | | | | | | |
| Byte4: Parameters 3 | Allocation Length | | | | | | | |
| Byte5: Control field | Vendor Specific | | | Reserved | | | Flag | Link |

Request sense by sending the command to the target. The response from MSC+ device should follow SCSI-2 specification, but only sense data corresponding to Error Codes 70h is required to be implemented. For SPTCCP devices, the sense data format is illustrated in the following table.

|  |  | Bit7 | Bit6 | Bit5 | Bit4 | Bit3 | Bit2 | Bit1 | Bit0 |
|---|---|---|---|---|---|---|---|---|---|
| Byte0: | Valid = 0 | 70h | | | | | | | |
| Byte1: | Reserved | | | | | | | | |
| Byte2: | Reserved | | | | | Sense Key = 9h | | | |
| Byte3–6: | Information | | | | | | | | |
| Byte7: | Additional sense length (n-7) | | | | | | | | |
| Byte8–11: | Command-specific information | | | | | | | | |
| Byte12: | Additional sense code = 80h | | | | | | | | |
| Byte13: | Additional sense code qualifier = ResponseCode | | | | | | | | |
| Byte14: | Field replaceable unit code = 0 | | | | | | | | |
| Byte15–17: | Sense-key specific = 0 | | | | | | | | |
| Byte18–n: | Additional sense bytes | | | | | | | | |

A Valid bit of zero indicates that the information filed is not as defined in the SCSI-2 specification. Since camera devices is not included in SCSI-2 specification yet, and the device-specific information field is not defined in this document, the Valid bit should be set to zero by the target.

The combination of Additional sense code and Additional sense code qualifier is used to indicate the error condition. When issuing SPTCCP specific commands (E0h, E1h, E2h, DFh), Sense Key should be set to 9h and Additional Sense Code is set to 80h to denote vendor-specific, and the Additional sense code qualifier is defined in the following table:

| Response Code | Description |
|---|---|
| 0x01 | OK |
| 0x02 | General Error |
| 0x05 | Operation Not Supported |
| 0x06 | Parameter Not Supported |
| 0x0A | DeviceProp Not Supported |
| 0x0C | Store Full |
| 0x0F | Access Denied |
| 0x11 | SelfTest Failed |
| 0x16 | Invalid Code Format |
| 0x18 | Capture Already Terminated |
| 0x19 | Device Busy |
| 0x1B | Invalid DeviceProp Format |
| 0x1C | Invalid DeviceProp Value |
| 0x1D | Invalid Parameter |
| All codes greater than 0x2F | Vendor-Extended Response Code |

The fourth MSC command is Read Info, designated by the hexadecimal code-E0H. This command allows an initiator such as a PC to request transfer of data from a target device such as a camera..With this command, the first 10 bytes of the Cdb are populated and structured with the following layout:

|  | Bit7 | Bit6 | Bit5 | Bit4 | Bit3 | Bit2 | Bit1 | Bit0 |
|---|---|---|---|---|---|---|---|---|
| Byte0: Operation Code | E0h | | | | | | | |
| Byte1: Logical Unit Number | LUN | | | Reserved | | | | |
| Byte2: Parameters 1 | SCSI DataTypeCode | | | | | | | |
| Byte3: Parameters 2 | Reserved | | | | | | | |
| Byte4: Parameters 3 | Data Type Qualifier | | | | | | | |
| Byte5: | | | | | | | | |
| Byte6: Parameters 4 | Data transfer length | | | | | | | |
| Byte7: | | | | | | | | |
| Byte8: | | | | | | | | |
| Byte9: Control field | Vendor Specific | | | Reserved | | | Flag | Link |

The SCSI DataTypeCode distinguishes between the different types of data that may be transferred between the initiator and the target. The types of transfers are specified in the following table:

|  | Bit7 | Bit6 | Bit5 | Bit4 | Bit3 | Bit2 | Bit1 | Bit0 |
| --- | --- | --- | --- | --- | --- | --- | --- | --- |
| Byte0: Operation Code | 1Dh | | | | | | | |
| Byte1: Logical Unit Number | LUN | | | PF | Reserved | SelfTest | DevOfL | UnitOfL |
| Byte2: Parameters 1 | Reserved | | | | | | | |

| Code | Description |
| --- | --- |
| 00h | Image |
| 01h | Vendor-specific |
| 02h | Reserved |
| 03h | Reserved |
| 04h–7Fh | Reserved |
| 80h | Device Information |
| 81h | Device Property Description |
| 82h | Device Property Value |
| 83h–FFh | Vendor-specific |

The Data Type Qualifier field provides means to differentiate data transfers of the same data type code. For SPTCCP devices, it is only used when Data Type Code is 81h or 82h, where the Data Type Qualifier equals the Device Property Code listed later in this document.

The data buffer should contain the data in the format determined by the native data type. The native data types corresponding to each device property code are also listed in the next chapter of this document:

| Byte # | Bit7 | Bit6 | Bit5 | Bit4 | Bit3 | Bit2 | Bit1 | Bit0 |
| --- | --- | --- | --- | --- | --- | --- | --- | --- |
| 0 | Data Buffer Length (n-2) | | | | | | | |
| 1 | | | | | | | | |
| 2 | Native Data Type Code of the following data | | | | | | | |
| 3 | | | | | | | | |
| 4 | Data | | | | | | | |
| N | | | | | | | | |

The fifth MSC command is Send Diagnostic, designated by the hexadecimal code 1DH. This command requests the target to perform diagnostic operations on itself. The data transfer direction is from Initiator to Target. The first 6 bytes of the Cdb are populated and structured with the following layout:

Byte3: Parameters 2  Parameter list length
Byte4: Parameters 3
Byte5: Control field  Vendor Specific  Reserved  Flag  Link A PF bit of one indicates that the parameters confirm to SCSI-2 standard, a zero means SCSI-1.

A Selftest bit of one directs the target to complete its default self-test, a zero requests that the target perform the diagnostic operation specified in the parameter list.

The sixth MSC command is Write Info, designated by the hexadecimal code-E1H. The Write Info command sends transfer data from the initiator to the target. This command is defined to use a 10-byte CDB. The data transfer direction is from Initiator to Target. The first 10 bytes of the Cdb are populated and structured with the following layout:

|  | Bit7 | Bit6 | Bit5 | Bit4 | Bit3 | Bit2 | Bit1 | Bit0 |
| --- | --- | --- | --- | --- | --- | --- | --- | --- |
| Byte0: Operation Code | E1h | | | | | | | |
| Byte1: Logical Unit Number | LUN | | | Reserved | | | | |
| Byte2: Parameters 1 | SCSI DataTypeCode | | | | | | | |
| Byte3: Parameters 2 | Reserved | | | | | | | |
| Byte4: Parameters 3 | Data Type Qualifier | | | | | | | |
| Byte5: | | | | | | | | |
| Byte6: Parameters 4 | Data transfer length | | | | | | | |
| Byte7: | | | | | | | | |
| Byte8: | | | | | | | | |
| Byte9: Control field | Vendor Specific | | | Reserved | | | Flag | Link |

The SCSI DataTypeCode, Data Type Qualifier, and data buffer layout are the same as defined in the READ command above. If a SCSI DataTypeCode and a Data Type Qualifier are both defined, but the Data Transfer Length is set to zero, then this command resets the default value of that particular device property.

The seventh MSC command is Start Stop Capture, which is designated by the hexadecimal code-E2H. This command requests the target device to capture images according to the manner specified through parameters. This command is defined to use 10-byte CDB. The data buffer, if specifically defined by vendor, has its transfer direction as from Target to Initiator. The first 10 bytes of the Cdb are populated and structured with the following layout:

|  | Bit7 | Bit6 | Bit5 | Bit4 | Bit3 | Bit2 | Bit1 | Bit0 |
|---|---|---|---|---|---|---|---|---|
| Byte0: OperationCode | E2h | | | | | | | |
| Byte1: Logical Unit Number | LUN | | | Reserved | | | | |
| Byte2: Parameters 1 | Capture Type Code | | | | | | | |
| Byte3: Parameters 2 | VSP | | Reserved | | | | | |
| Byte4: Parameters 3 | Capture Format Code | | | | | | | |
| Byte6: Parameters 4 | Optional Vendor specific parameter Buffer Length. | | | | | | | |
| Byte7: | | | | | | | | |
| Byte8: | | | | | | | | |
| Byte9: Control field | Vendor Specific | | Reserved | | | | Flag | Link |

The Capture Type Code defines the behavior of the capturing functions on the target:

| Capture Type Code | Description |
|---|---|
| 0 | Capture a single image |
| 1 | Initiate Open Capture |
| 2 | Terminate Open Capture |

The capture format code, if non-zero, will advice the device the Initiator preferred capture format. If the target is unable to capture in that format, it should return error and set the response code to be "Operation Not Supported". If the capture format code is zero, the target will capture in its default format. Clearing VSP bit and Parameter 4 to indicate that there is no vendor-specific parameter buffer. The VSP bit of 1 indicates that Parameter 4 has meaningful vendor specific parameter buffer. This parameter could be useful, for example, if vendor wants to use it to communicate the status and location of the captured picture file on the device.

The eighth MSC command is Reset Device, which is designated by the hexadecimal code-E2H. This command requests the target to reset its state to the default state. This command is defined to use 6-byte CDB. . The first 6 bytes of the Cdb are populated and structured with the following layout:

|  | Bit7 | Bit6 | Bit5 | Bit4 | Bit3 | Bit2 | Bit1 | Bit0 |
|---|---|---|---|---|---|---|---|---|
| Byte0: Operation Code | DFh | | | | | | | |
| Byte1: Logical Unit Number | LUN | | | Reserved | | | | |
| Byte2: Parameters 1 | Reserved | | | | | | | |
| Byte3: Parameters 2 | Reserved | | | | | | | |
| Byte4: Parameters 3 | Reserved | | | | | | | |
| Byte5: Control field | Vendor Specific | | Reserved | | | | Flag | Link |

This is a simple command with no data buffer.

Earlier in this document, there were references made to operational codes, response codes and property codes. This portion of the document will provide some additional detail on those codes. Operation codes are primarily relevant for the Mode Select and Mode Sense command. There are a limited number of allowable Operation Codes for an MSC device. Some codes and the associated relevant operations are shown below:

| Operation Code | Operation Name |
|---|---|
| 0x1001 | GetDeviceInfo |
| 0x1014 | GetDevicePropDesc |
| 0x1015 | GetDevicePropValue |

With regard to response codes, SPTCCP utilizes a subset of PIMA PTP command codes and data types, and also provides its own selections and extensions. The response codes within SPTCCP are also adapted from the PTP specification although only a subset of the original response codes are used. The following table illustrates current response codes and the associated descriptions that are supported by SPTCCP.

| Response Code | Description |
|---|---|
| 0x01 | OK |
| 0x02 | General Error |
| 0x05 | Operation Not Supported |
| 0x06 | Parameter Not Supported |
| 0x0A | DeviceProp Not Supported |
| 0x0C | Store Full |
| 0x0F | Access Denied |
| 0x11 | SelfTest Failed |
| 0x16 | Invalid Code Format |
| 0x18 | Capture Already Terminated |
| 0x19 | Device Busy |
| 0x1B | Invalid DeviceProp Format |

-continued

| Response Code | Description |
|---|---|
| 0x1C | Invalid DeviceProp Value |
| 0x1D | Invalid Parameter |
| All codes greater than 0x2F | Vendor-Extended Response Code |

In addition to the above described codes, there are four other categories of codes supported by PIMA PTP namely, Event codes, Device property codes, Object Format codes and Data type codes. Each of these code categories enable certain type of information to be obtained and exchanged between the initiating and target devices. To the extent that a particular category is either supported or not supported within SPTCCP, this document will identify such categories but will not provide the details of the specific category since this information can be found in other materials that define PTP commands, such as PIMA 15740 Version 1.0—Photography Electronic still picture imaging Picture Transfer Protocol for Digital Still Photography Device. This source and other similar sources that define PTP commands are expressly incorporated in this document.

SPTCCP does not support events communication between the Initiator and the Target as does PTP there are therefore no Event Codes defined within SPTCCP. On the other hand, device property codes, also known as DevicePropCode as previously discussed, describe the properties of the target that might be set or retrieved through SPTCCP. The following codes and description are an illustrative list of currently supported device property codes:

| DevicePropCode | Name |
|---|---|
| 0x5000 | Undefined |
| 0x5001 | BatteryLevel |
| 0x5002 | FunctionalMode |
| 0x5003 | ImageSize |
| 0x5004 | CompressionSetting |
| 0x5005 | WhiteBalance |
| 0x5006 | RGB Gain |
| 0x5007 | F-Number |

-continued

| DevicePropCode | Name |
|---|---|
| 0x5008 | FocalLength |
| 0x5009 | FocusDistance |
| 0x500A | FocusMode |
| 0x500B | ExposureMeteringMode |
| 0x500C | FlashMode |
| 0x500D | ExposureTime |
| 0x500E | ExposureProgramMode |
| 0x500F | ExposureIndex |
| 0x5010 | ExposureBiasCompensation |
| 0x5011 | DateTime |
| 0x5012 | CaptureDelay |
| 0x5013 | StillCaptureMode |
| 0x5014 | Contrast |
| 0x5015 | Sharpness |
| 0x5016 | DigitalZoom |
| 0x5017 | EffectMode |
| 0x5018 | BurstNumber |
| 0x5019 | BurstInterval |
| 0x501A | TimelapseNumber |
| 0x501B | TimelapseInterval |
| 0x501C | FocusMeteringMode |
| 0x501D | UploadURL |
| 0x501E | Artist |
| 0x501F | CopyrightInfo |
| All other codes with MSN of 0101 | Reserved |
| All codes with MSN of 1101 | Vendor-Extended Response Code |

SPTCCP does not support the data object concept of PTP. However, ObjectFormatCodes are used with GetDeviceInfo operation to get information on the image storage file format. The following table illustrates available and supported object format codes.

| ObjectFormat Code | Type | Format | Description |
|---|---|---|---|
| 0x3000 | A | Undefined | Undefined |
| 0x3001 | A | Association | Association (e.g. folder) |
| 0x3002 | A | Script | Device-model-specific script |
| 0x3003 | A | Executable | Device-model-specific binary executable |
| 0x3004 | A | Text | Text file |
| 0x3005 | A | HTML | HyperText Markup Language file (text) |
| 0x3006 | A | DPOF | Digital Print Order Format File (text) |
| 0x3007 | A | AIFF | Audio Clip |
| 0x3008 | A | WAV | Audio Clip |
| 0x3009 | A | MP3 | Audio Clip |
| 0x300A | A | AVI | Video Clip |
| 0x300B | A | MPEG | Video Clip |
| 0x300C | A | ASF | Microsoft Advanced Streaming Format (video) |
| 0x3800 | I | Undefined | Unknown Image Format |
| 0x3801 | I | EXIF/JPEG | Exchangable File Format, JEIDA standard |
| 0x3802 | I | TIFF/EP | Tag Image File Format for Electronic Photography |
| 0x3803 | I | FlashPix | Structured Storage Image Format |
| 0x3804 | I | BMP | Microsoft Windows Bitmap File |
| 0x3805 | I | CIFF | Cannon Camera Image File Format |
| 0x3806 | I | Undefined | Reserved |
| 0x3807 | I | GIF | Graphics Interchange Format |
| 0x3808 | I | JFIF | JPEG File Exchange Format |
| 0x3809 | I | PCD | PhotoCD Image Pac |
| 0x380A | I | PICT | QuickDraw Image Format |
| 0x380B | I | PNG | Portable Network Graphics |
| 0x380C | I | Undefined | Reserved |
| 0x380D | I | TIFF | Tag Image File Format |
| 0x380E | I | TIFF/IT | Tag Image File Format for Information Technology (graphics arts) |
| 0x380F | I | JP2 | JPEG2000 Baseline File Format |
| 0x3810 | I | JPX | JPEG2000 Extended File Format |

-continued

| ObjectFormat Code | Type | Format | Description |
|---|---|---|---|
| All other codes with MSN of 0011 | Any | Undefined | Reserved for future use |
| All codes with MSN of 1011 | Any | Vendor-Defined | Vendor-Defined |

Another adaptation from PTP specification is the Data type codes. The data type codes within SPTCCP contain some extensions for MSC specific structures. All data types use Big-Endian byte order in memory. The following table lists for illustrative purposes, supported data type codes and their associated descriptions:

| Datatype Code | Type | Description |
|---|---|---|
| 0x0000 | | Undefined |
| 0x0001 | INT8 | Signed 8 bit integer |
| 0x0002 | UINT8 | Unsigned 8 bit integer |
| 0x0003 | INT16 | Signed 16 bit integer |
| 0x0004 | UINT16 | Unsigned 16 bit integer |
| 0x0005 | INT32 | Signed 32 bit integer |
| 0x0006 | UINT32 | Unsigned 32 bit integer |
| 0x0007 | INT64 | Signed 64 bit integer |
| 0x0008 | UINT64 | Unsigned 64 bit integer |
| 0x0009 | INT128 | Signed 128 bit integer |
| 0x000A | UINT128 | Unsigned 128 bit integer |
| 0x4001 | AINT8 | Array of Signed 8 bit integer |
| 0x4002 | AUINT8 | Array of Unsigned 8 bit integer |
| 0x4003 | AINT16 | Array of Signed 16 bit integer |
| 0x4004 | AUINT16 | Array of Unsigned 16 bit integer |
| 0x4005 | AINT32 | Array of Signed 32 bit integer |
| 0x4006 | AUINT32 | Array of Unsigned 32 bit integer |
| 0x4007 | AINT64 | Array of Signed 64 bit integer |
| 0x4008 | AUINT64 | Array of Unsigned 64 bit integer |
| 0x4009 | AINT128 | Array of Signed 128 bit integer |
| 0x400A | AUINT128 | Array of Unsigned 128 bit integer |
| 0xFFFF | STR | Variable-length Unicode String |
| Above are PTP defined data type code, below are SPTCCP extended data code: | | |
| 0x8001 | REAL | Contains two INT32 integers (numerator, denominator) |
| 0x8002 | structDeviceInfo | DeviceInfo structure |
| 0x8003 | strDateTime | ISO8601 date time string in Unicode, "YYYYMMDDThhmmss.s" |

In SPTCCP, Real numbers types as shown in the table above are generally stored as two parts within a structure. The numerator and denominator are members of the structure. The structure for real numbers can be defined as follows:

```
typedef struct _REAL {
    UINT32      numerator;
    UINT32      denominator;
} structREAL;
```

As indicated in the data types table above, another type that is use for storing important device information is a structure that is returned through the GetDeviceInfo operation that was previously discussed. The structure is of variable length but it is recommended in an embodiment of this invention that vendors limit the size of this structure to be smaller than 260−16−16=228 bytes. This is because earlier versions of Windows limit the data buffer size to 260−16 for IOCTL commands, and SCSI commands will also need at least 16 bytes for Mode Page headers. Although other implementations of this protocol may have no buffer size limit, the act of limiting the size will help the device to get backward compatibility. The device information structure may be defined as follows:

```
typedef struct _DeviceInfo {
    UINT16      StandardVersion;
    UINT32      VendorExtensionID;
    UINT16      VendorExtensionVersion;
    STR         VendorExtensionDesc;
    UINT16      FunctionalMode;
    AUINT16     OperationSupported; // OperationCode Array
    AUINT16     EventsSupported; // EventCode Array
    AUINT16     DevicePropertiesSupported; // DevicePropCode Array
    AUINT16     CaptureFormats; // ObjectFormatCode Array
    AUINT16     ImageFormats; // ObjectFormatCode Array
    STR         Manufacturer;
    STR         Model;
    STR         DeviceVersion;
    STR         SerialNumber;
} structDeviceInfo
```

The required content of this structure is self evident from the named members above to one skilled in the art.

The present invention has been described in connection with exemplary embodiments which are intended to be illustrative rather than restrictive. For example, the invention has been described in the context of controlling a Mass Storage Class Digital Camera (MSC) from within the operating system of a PC on a USB medium. The protocol could just as easily relate to many other types of communications medium, such as a network cable or other forms of connectivity between a Digital class storage device and a PC.

Alternative embodiments of the present invention will become apparent to those skilled in the art to which it pertains upon review of the specification, including the drawing figures. Accordingly, the scope of the present invention is defined by the appended claims rather than the foregoing description.

We claim:

1. A method for use in a computing device operating with an operating system for controlling a mass storage class digital imaging device comprising:
    providing a Picture Transfer Protocol (PTP) control command that is interpretable by firmware on the mass storage class digital imaging device;
    packaging said PTP control command in a SCSI transport protocol; and
    transmitting said packaged PTP control command in the SCSI transport protocol to the mass storage class digital imaging device.

2. A method as recited in claim 1 further comprising receiving said packaged PTP control command at the mass storage class digital imaging device.

3. A method as recited in claim 2 further comprising unpackaging said packaged PTP control command.

4. A method as recited in claim 3 further comprising implementing said PTP control command at the mass storage class digital imaging device.

5. A method as recited in claim 1 wherein said PTP control command comprises:
   extended commands that are specific to the mass storage classs digital imaging device.

6. A method as recited in claim 1 wherein said packaging comprises:
   providing entries in a SCSI Pass through structure including a command descriptor block;
   providing entries and values for a command descriptor block within said SCSI Pass through structure; and
   providing data buffers to hold resulting information.

7. A method as recited in claim 1 wherein said transmitting is via a USB protocol as the SCSI transport protocol.

8. A computer-readable medium having computer-executable instructions for performing the steps recited in claim 1.

9. A computer system having a memory, an operating system and a central processor, said processor being operable to execute the instructions stored on the computer-readable medium of claim 8.

10. A method for use in a computing device operating with an operating system for communicating Picture Transfer Protocol (PTP) control commands between an application program and a USB mass storage class digital imaging device comprising:
    generating a device specific PTP control command including a command descriptor block in a computing environment upon interaction with the application program;
    transmitting said device specific PTP control command as a SCSI pass through command via a USB channel to the USB device;
    interpreting said SCSI Pass through command; and
    executing the device specific PTP control command using firmware on the USB device.

11. A method as recited in claim 10 wherein said device specific PTP control command is one of a plurality of available commands associated with the USB device and wherein said execution of said device specific PTP control command results in at least one action by the USB device.

12. A computer-readable medium having computer-executable instructions for performing the steps recited in claim 10.

13. A computer system having a memory, an operating system and a central processor, said processor being operable to execute the instructions stored on the computer-readable medium of claim 12.

14. A method for use in a mass storage class digital imaging device controllable by a computing device, said mass storage class digital imaging device receiving a command from the computing device via a SCSI transport protocol, said command including a packaged PTP control command packaged in the SCSI transport protocol interpretable by firmware on the imaging device, said PTP control command being unpackaged and implemented to control said mass storage class digital imaging device.

15. A computer-readable medium having computer-executable instructions for performing the steps recited in claim 14.

16. A computer system having a memory, an operating system and a central processor, said processor being operable to execute the instructions stored on the computer-readable medium of claim 15.

17. A method of controlling a digital content device, comprising:
    providing a Picture Transfer Protocol (PTP) control command that is interpretable by firmware on the digital content device;
    packaging the PTP control command in a SCSI transport protocol; and
    transmitting the packaged PTP control command in the SCSI transport protocol to the digital content device.

* * * * *

UNITED STATES PATENT AND TRADEMARK OFFICE
CERTIFICATE OF CORRECTION

| | | |
|---|---|---|
| PATENT NO. | : 7,039,727 B2 | Page 1 of 1 |
| APPLICATION NO. | : 09/949166 | |
| DATED | : May 2, 2006 | |
| INVENTOR(S) | : Franc J. Camara et al. | |

It is certified that error appears in the above-identified patent and that said Letters Patent is hereby corrected as shown below:

In column 4, line 22, delete "non-volatile" and insert -- nonvolatile --, therefor.

In column 12, line 43, after "camera." delete ".".

In column 14, line 26, delete "Selftest" and insert -- SelfTest --, therefor.

In column 15, line 43, after "CDB." delete ".".

In column 19, line 44, delete "denomenator" and insert -- denominator --, therefor.

In column 21, line 12, in Claim 5, delete "classs" and insert -- class --, therefor.

In column 21, line 17, in Claim 6, delete "a" and insert -- the --, therefor.

In column 21, line 40, in Claim 10, delete "SCSI Pass through" and insert -- SCSI pass through --, therefor.

Signed and Sealed this

Twenty-third Day of March, 2010

David J. Kappos
*Director of the United States Patent and Trademark Office*